United States Patent
Hansson

(10) Patent No.: US 10,050,514 B2
(45) Date of Patent: Aug. 14, 2018

(54) CURRENT RIPPLE CONTROL BY DERIVATION AND SWITCHING

(71) Applicant: TELEFONAKTIEBOLAGET LM ERICSSON (PUBL), Stockholm (SE)

(72) Inventor: Lars Hansson, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/526,137

(22) PCT Filed: Nov. 12, 2014

(86) PCT No.: PCT/SE2014/051342
§ 371 (c)(1),
(2) Date: May 11, 2017

(87) PCT Pub. No.: WO2016/076772
PCT Pub. Date: May 19, 2016

(65) Prior Publication Data
US 2017/0324317 A1    Nov. 9, 2017

(51) Int. Cl.
| | |
|---|---|
| *H04B 1/40* | (2015.01) |
| *H02M 1/15* | (2006.01) |
| *H02M 3/04* | (2006.01) |
| *H02M 1/00* | (2006.01) |

(52) U.S. Cl.
CPC .............. *H02M 1/15* (2013.01); *H02M 3/04* (2013.01); *H04B 1/40* (2013.01); *H02M 2001/0009* (2013.01)

(58) Field of Classification Search
CPC .. H02M 1/15; H02M 3/04; H02M 2001/0009; H04B 1/40
USPC .......................................... 375/219, 238, 295
See application file for complete search history.

(56) References Cited

U.S. PATENT DOCUMENTS

| | | | |
|---|---|---|---|
| 8,362,813 B2* | 1/2013 | Yeung | H03F 3/195 326/88 |
| 9,697,450 B1* | 7/2017 | Lee | G06K 19/06206 |
| 9,843,271 B1* | 12/2017 | Nikitin | H02M 7/217 |
| 2012/0176822 A1 | 7/2012 | Menegoli et al. | |
| 2013/0141068 A1* | 6/2013 | Kay | G05F 1/46 323/282 |

FOREIGN PATENT DOCUMENTS

WO    2014042690 A1    3/2014

* cited by examiner

*Primary Examiner* — Siu Lee
(74) *Attorney, Agent, or Firm* — Baker Botts, LLP

(57) ABSTRACT

A method and circuitry for switching current to a load. The circuitry for supplying a current to a load comprises a sensor configured to sense the current supplied via a sensor input and to produce an output signal representing a time derivative of the sensed current, and a switch configured to switch the current, a switching frequency of the switch being controlled by said output signal representing a time derivative of the sense current, thereby producing a switched output current to the load.

14 Claims, 4 Drawing Sheets

CURRENT RIPPLE CONTROL BY DERIVATION AND SWITCHING

This application is a 371 of International Application No. PCT/SE2014/051342, filed Nov. 12, 2014, the disclosure of which is fully incorporated herein by reference.

TECHNICAL FIELD

The invention relates to a method and circuitry for switching current to a load.

BACKGROUND

In the art, telecommunication equipment is often powered by high currents in −48V DC systems. The power consumption in such systems is subject to rapid variations due to fast fluctuations in radio output power. This leads to transients of the input currents which in turn causes voltage ripple that can damage batteries and disturb other devices in the system. Therefore, it is necessary to minimize, or at least reduce, the voltage ripple while at the same time being capable of handling the fluctuations in radio output power. For battery protection, relatively large-scale capacitors are used in connection to the battery.

The solution to this problem today is to use large reservoir capacitor banks as filters or energy storage to smooth the rippling current. These capacitors tend to be bulky, expensive and show poor reliability. There are, however, means to decrease the size of the capacitor banks.

One is to increase the voltage and thus the amount of energy stored in the capacitor bank. However, this solution is even more expensive, and provides poor power efficiency in the form of increased the power consumption. Moreover, reliability is poor and a further voltage increase may be dangerous. Another straightforward solution is to split up the capacitor bank and use resistors or inductors to form a low-pass filter, but drawbacks with this solution include additional power consumption of the resistors and size and cost of feasible inductors.

SUMMARY

An object of the present invention is to solve or at least mitigate this problem in the art and to provide an improved circuitry for switching current to a load.

This object is attained in a first aspect of the present invention by a circuitry for supplying a current to a load. The circuitry comprises a sensor configured to sense the current supplied via a sensor input and to produce an output signal representing a time derivative of the sensed current, and a switch configured to switch the current, a switching frequency of the switch being controlled by said output signal representing a time derivative of the sense current, thereby producing a switched output current to the load.

This object is attained in a second aspect of the present invention by a method for supplying a current to a load. The method comprises receiving the current, sensing the received current, producing a signal representing a time derivative of the sensed current, and switching the received current, a switching frequency of the switching being controlled by the signal representing a time derivative of the sensed current, thereby producing a switched current to the load.

Advantageously, by providing a sensor configured to measure an input current, which is typically subject to ripple, which sensor produces an output signal being a representation of a time derivative of the measured current and supplies the output signal—i.e. the current derivative—to a switch as a switch control signal, the ripple in the current is decreased since a "synthetic" inductor is formed by measuring the current and performing a derivation of the measurement. Further advantageous is that this decrease in current ripple is attained without using bulky and costly coils. Hence, current transients generated in the load can advantageously be suppressed.

A "synthetic" inductor is thus formed by measurement of the current and performing a derivation of the measurement. The derivative is then supplied as a switch control signal to the switch that controls the current. As the current is switched very fast (i.e. significantly higher than a ripple frequency of the measured current in one embodiment using pulse width modulation (PWM) techniques) the current output from the switch resembles the current output of a coil. In an embodiment, a microcontroller is arranged as the sensor to measure the current and perform the time derivation of the measured current for controlling the switch.

Hence, by using the sensor (with e.g. a microcontroller) producing a time derivative of a measured current in combination with the switch receiving a switch control signal based on the time derivative to advantageously create an appropriate low pass filter, a circuitry is formed which suppresses changes in electric current passing through it, i.e. the circuitry will block ripple in the form of AC current while allowing DC current to pass.

It should be noted that the time derivate of the measured current could be based on a time derivative of first degree, or second degree, or any other appropriate degree (or a combination thereof). The switch control signal could be based on the time derivative of any appropriate degree and could further take into account e.g. amplitude of the measured current and extension in time of the time derivative.

Preferred embodiments of the present invention will be discussed in the following.

Further features of, and advantages with, the present invention will become apparent when studying the appended claims and the following description. Disclosed features of example embodiments may be combined to create embodiments other than those described in the following as readily understood by one of ordinary skill in the art to which this invention belongs, without departing from the scope of the present invention, as defined by the appended claims.

BRIEF DESCRIPTION OF THE DRAWINGS

The invention is now described, by way of example, with reference to the accompanying drawings, in which.

DETAILED DESCRIPTION

Figure 1:
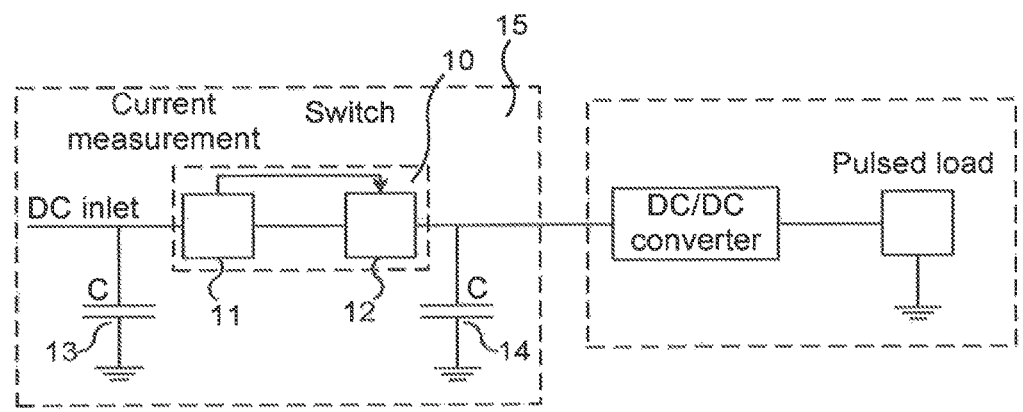
FIG. 1 is a schematic view of a circuitry for supplying a current to a load according to an embodiment of the present invention.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable. The first and second switch assemblies defined in the appended claims are occasionally referred to as main switches throughout the description, while the third and fourth switch assemblies occasionally are referred to as help switches throughout the description.

FIG. 1 is a schematic view of a circuitry 10 for supplying a current to a load according to an embodiment. The circuitry 10 comprises a sensor 11, such as a microcontroller or a central processing unit (CPU), which is configured to sense the current at a direct current (DC) input of the sensor and to produce an output signal representing a time derivative of the sensed current. The time derivative of the DC input current is used as a switch control signal to a switch 12 configured to switch DC input current in order to produce a switched output current from the circuitry 10.

As can be seen, the circuitry 10 may in embodiments of the present invention be complemented with one or more of an input capacitor 13 and an output capacitor 14. Advantageously, the two capacitors 13, 14, the sensor 11 and the switch 12 form a low-pass filter structure 15 that significantly increases the filtering effect (compared for instance with a single capacitor). As previously mentioned, an inductor is emulated by the sensor 11 and the switch 12, thereby forming an LC filter 15. Further, it is possible to design multi-pole filters by cascading a number of filters 15. That will attenuate the current ripple even more. Further advantageous is that smaller reservoir capacitors can be used, thus decreasing the size of the unit.

Moreover, in contrast to the art, the filtering of the ripple is with the present invention advantageously far more efficient and further decreases the constraints of cabling used in connection to the circuitry.

In FIG. 1, the load to which the current is switched by the filter 15 is illustrated in the form of a DC/DC converter and a pulsed load such as a radio transceiver. The DC/DC converter and the radio transceiver is typically part of a mast-mounted Remote Radio Unit (RRU), a Radio Base Station (RBS) or any other appropriate device.

Figure 2:
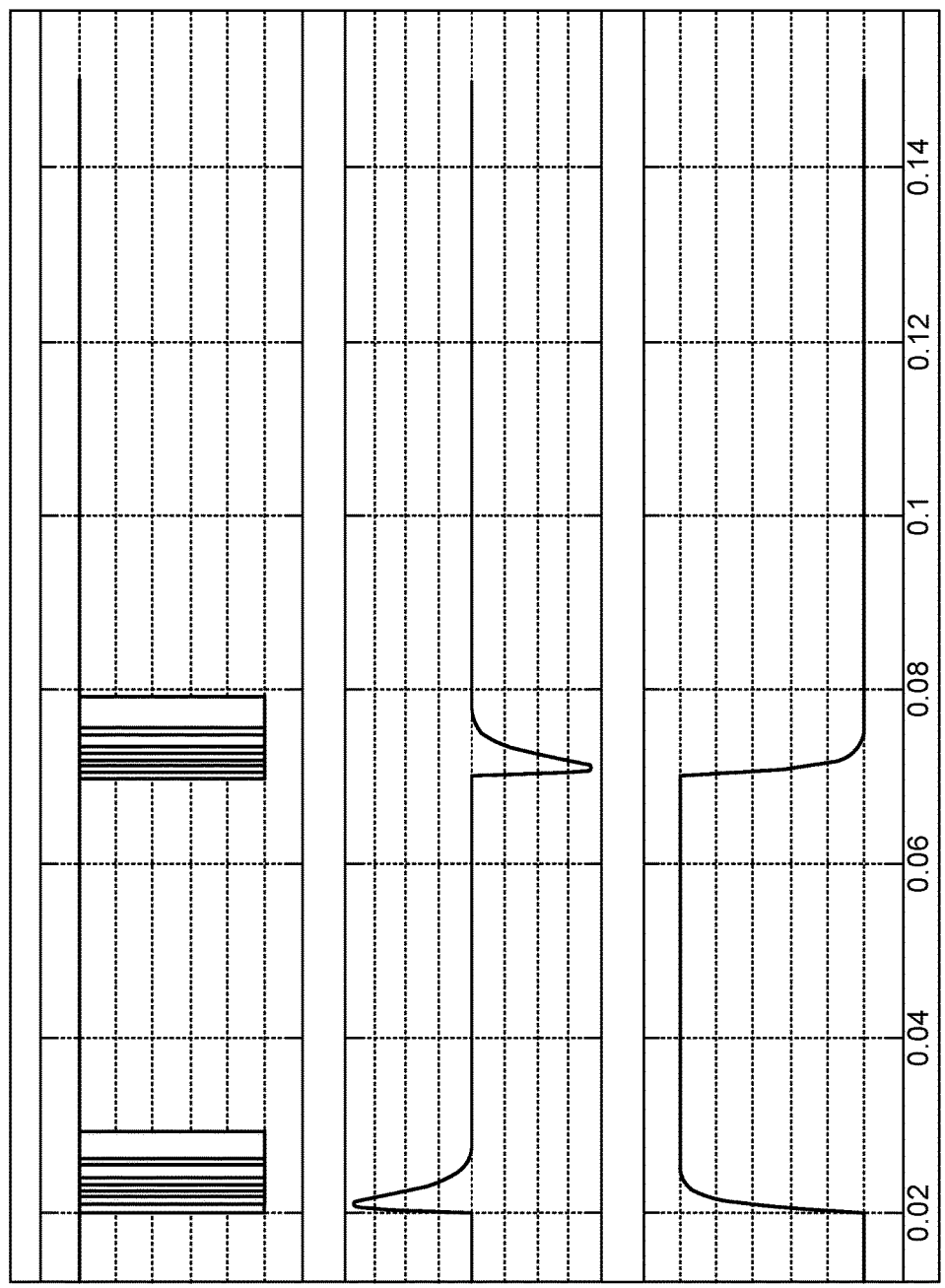
FIG. 2 illustrates a current signal, a time derivative of the current signal and a generated pulse width modulation (PWM) signal according to an embodiment of the present invention.

FIG. 2 illustrates in a bottom view an input current i in the form of a square wave, while a mid view shows a time derivative di/dt of the input current i. A top view shows a PWM signal based on the time derivative di/dt, which PWM signal is supplied to the switch 12 as a control signal for switching the input current i to a load.

Figure 3:
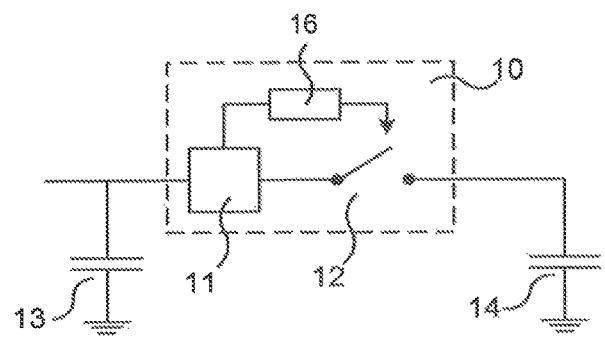
FIG. 3 is a schematic view of the circuitry for supplying a current to a load of FIG. 1 according to a further embodiment of the present invention.

FIG. 3 illustrates the circuitry 10 of FIG. 1 which in an embodiment further comprises a PWM unit 16 for supplying the switch 12 with a PWM switch signal. Typically, the sensor 11 and the PWM unit 16 are implemented by means of the previously mentioned CPU. The PWM signal can be created using any appropriate PWM methodology. However, in an embodiment of the present invention, a pulse width of the PWM signal is selected to be proportional to a magnitude of the time derivative of the sensed current, where a greater magnitude of the time derivative results in the PWM signal controlling the switch to be closed to a greater extent.

Thus, the greater changes in input current, the shorter time period the switch is closed, which will block AC components—i.e. ripple—of the DC input current from reaching the filter output. The filter 15 consequently acts as an LC filter.

In a further, embodiment, the pulse width of the PWM signal supplied by the PWN unit 16 to the switch 12 is constant, regardless of the magnitude of the derivative, in which case the sensor 11 and the switch 12 together with the input and output capacitors 13, 14 emulates an RC filter.

Figure 4:
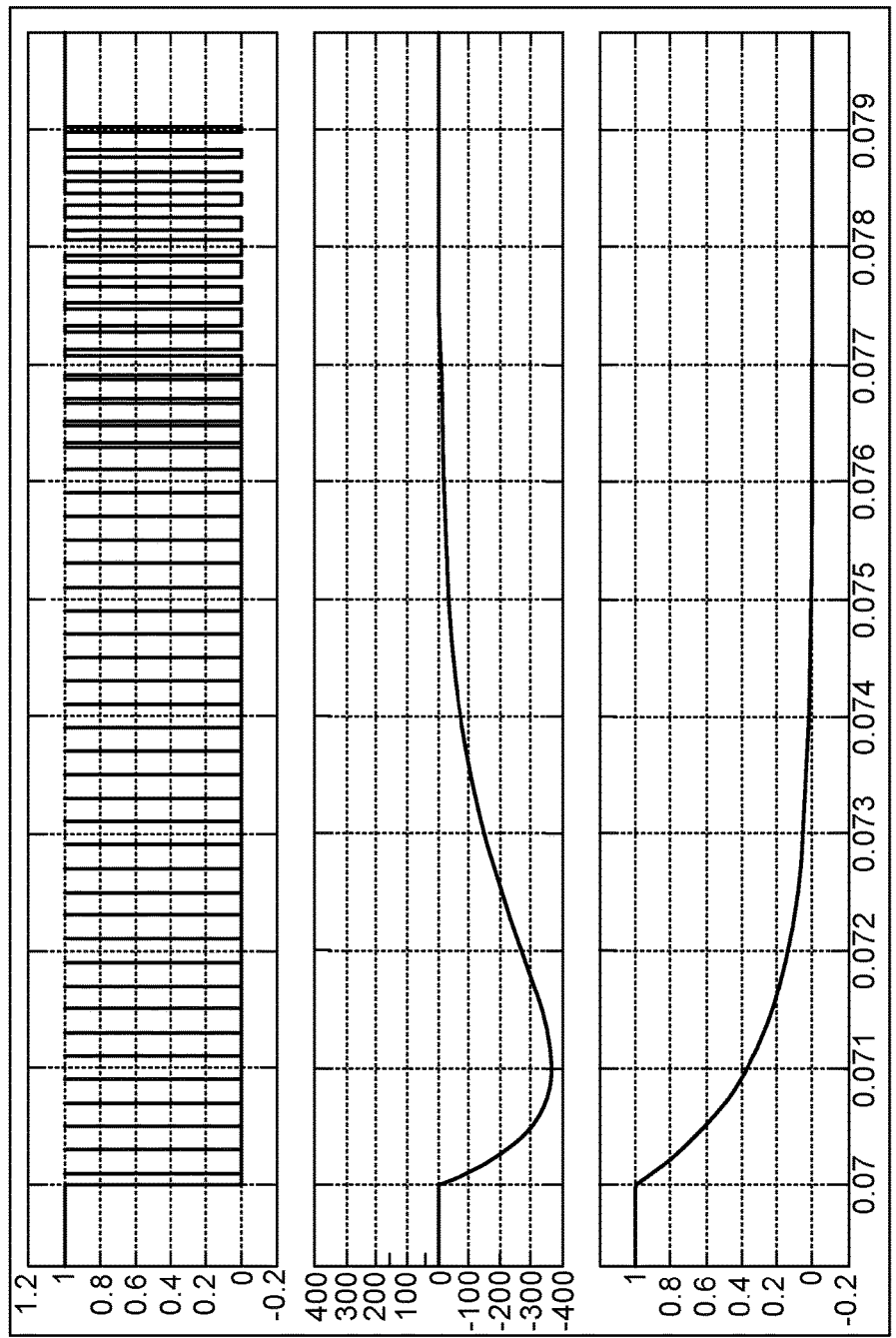
FIG. 4 illustrates the signals of FIG. 2 in a smaller time window.

FIG. 4 illustrates the signals of FIG. 2 in a smaller time window, where the bottom view shows a trailing edge of the square wave input current i of FIG. 2, in the form of a square wave, the mid view shows the corresponding derivative di/dt of the input current i. The top view shows the PWM signal which is generated by the PWM unit 16 based on the derivative di/dt supplied by the sensor 11, which PWM signal is supplied to the switch 12 as a control signal for switching the input current i to a load.

Advantageously, the circuitry 10 (or complete filter 15) is comprised in a mast-mounted RRU for decreasing the amount of ripple in current supplied to the RRU. Since mast-mounted RRUs typically require a great deal of cabling from the ground up to the mast, the present invention facilitates using thinner cables due to the reduced current ripple. Moreover, if all the filtering is contained in the RRU, easier configuration of communication sites is facilitated for example with respect to cabling.

Again with reference to FIG. 1, as previously mentioned, the sensor 11 and the switch 11 (and possibly the PWM unit 16 of FIG. 3) may be implemented in a microcontroller or a CPU arranged to execute a computer program downloaded to a suitable storage medium (not shown) associated with the microcontroller, such as a Random Access Memory (RAM), a Flash memory or a hard disk drive. The microcontroller is arranged to carry out a method of supplying a current to a load according to embodiments of the present invention when the appropriate computer program comprising computer-executable instructions is downloaded to the storage medium and executed by the microcontroller. The storage medium may also be a computer program product comprising the computer program. Alternatively, the computer program may be transferred to the storage medium by means of a suitable computer program product, such as a Digital Versatile Disc (DVD) or a memory stick. As a further alternative, the computer program may be downloaded to the storage medium over a network. The microcontroller may alternatively be embodied in the form of a digital signal processor (DSP), an application specific integrated circuit (ASIC), a field-programmable gate array (FPGA), a complex programmable logic device (CPLD), etc.

Figure 5:
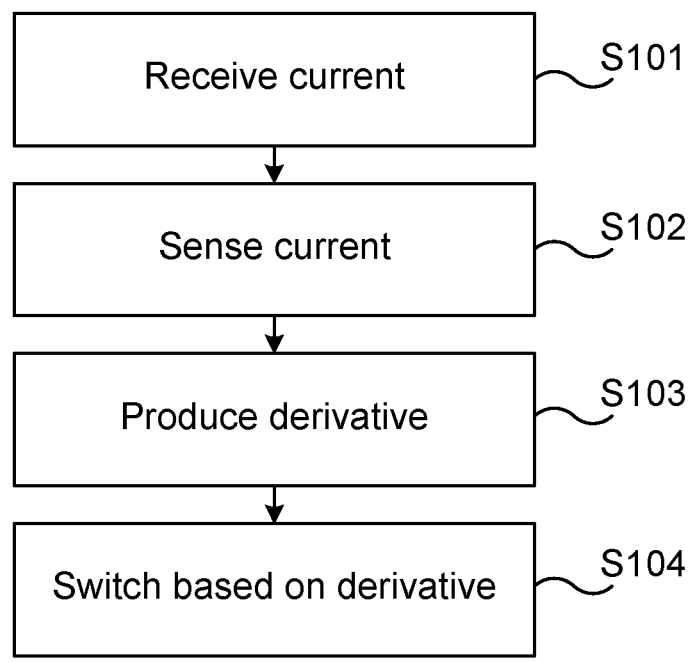
FIG. 5 illustrates a flowchart of a method according to an embodiment of the present invention.

FIG. 5 illustrates a method of supplying a current to a load according to an embodiment of the present invention. Reference will further be made to FIG. 1 for structural elements. In a first step S101, the sensor 11 receives the current supplied to the circuitry 10. In a second step S102, the sensor 11 senses the received current and produces, in step S103, a signal representing a time derivative of the sensed current. Thereafter, in step S104, the sensor controls the switch 12 to switch the received current, a switching frequency of the switching being controlled by the signal representing a time derivative of the sense current, thereby producing a switched current to the load.

As previously mentioned, it should be noted that the time derivate of the measured current could be based on a time derivative of first degree, or second degree, or any other appropriate degree (or a combination thereof). The switch control signal could be based on the time derivative of any appropriate degree and could further take into account e.g. amplitude of the measured current and extension in time of the time derivative. By using a microcontroller, this functionality can be implemented in software which facilitates on-the-fly-changes in algorithms.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A circuitry for supplying a current to a load, comprising: a sensor configured to sense the current supplied via a sensor input and to produce an output signal representing a time derivative of the sensed current; and a switch configured to switch the current, a switching frequency of the switch being controlled by said output signal representing the time derivative of the sense current, thereby producing a switched current to the load.

2. The circuitry of claim 1, further comprising: a pulse width modulation (PWM) unit configured to receive said output signal representing the time derivative of the sensed current and produce a PWM signal based on said output signal to be supplied to the switch for controlling the switching frequency.

3. The circuitry of claim 2, wherein a pulse width of the PWM signal is selected to be proportional to a magnitude of the time derivative of the sensed current, where a greater magnitude of the time derivative results in the PWM signal controlling the switch to be closed to a greater extent.

4. The circuitry of claim 2, wherein a pulse width of the PWM signal is selected to be constant.

5. The circuitry of claim 1, further comprising: an input capacitor arranged at the sensor input for receiving a direct current (DC) voltage input to the circuitry.

6. The circuitry of claim 1, further comprising: an output capacitor arranged at a switch output for delivering an output voltage to the load.

7. The circuitry of claim 1, the switching frequency being configured to be higher than a ripple frequency of the sensed current.

8. The circuitry of claim 1, the output signal representing the time derivative of the sensed current being based on a multi-degree time derivative of the sensed current.

9. A mast-mounted Radio Resource Unit, (RRU) comprising the circuitry of claim 1.

10. A method for supplying a current to a load, comprising: receiving the current; sensing the received current; producing a signal representing a time derivative of the sensed current; switching the received current, a switching frequency of the switching being controlled by the signal representing the time derivative of the sense current, thereby producing a switched current to the load.

11. The method of claim 10, further comprising: producing a pulse width modulation, PWM, signal based on the signal representing the time derivative of the sensed current; wherein the step of switching the received current comprises switching the received current using the PWM signal as switch signal.

12. The method of claim 10, further comprising: filtering the received current.

13. The method of claim 10, further comprising: filtering the switched current.

14. A non-transitory computer-readable medium comprising computer-executable instructions for causing a device to perform the steps recited in claim 10 when the computer-executable instructions are executed on a processing unit included in the device.

* * * * *